(12) United States Patent
Douglas et al.

(10) Patent No.: US 9,145,235 B1
(45) Date of Patent: Sep. 29, 2015

(54) TELEVISION POCKET DECORATOR

(71) Applicants: Terry Douglas, Belleville, IL (US);
Dorrine E. Douglas, Belleville, IL (US)

(72) Inventors: Terry Douglas, Belleville, IL (US);
Dorrine E. Douglas, Belleville, IL (US)

(*) Notice: Subject to any disclaimer, the term of this patent is extended or adjusted under 35 U.S.C. 154(b) by 35 days.

(21) Appl. No.: 14/084,792

(22) Filed: Nov. 20, 2013

(51) Int. Cl.
*B65D 27/08* (2006.01)
*G06F 1/16* (2006.01)

(52) U.S. Cl.
CPC .............. *B65D 27/08* (2013.01); *G06F 1/1607* (2013.01); *Y10S 248/918* (2013.01)

(58) Field of Classification Search
CPC .............. A47B 2200/0094; A47B 21/045; G06F 1/1607; G06F 1/1611; Y10S 248/918; B65D 27/02; B65D 27/08; B65D 31/12; B65D 33/02; B65D 33/04
USPC .............. 383/38, 39; 248/205.2, 442.2, 918; 40/725, 776, 594; 150/165; 428/100, 428/14; 206/320; 220/9.1–9.4
See application file for complete search history.

(56) References Cited

U.S. PATENT DOCUMENTS

| | | | | |
|---|---|---|---|---|
| 3,294,905 A * | 12/1966 | Jonassen | ........................ | 348/841 |
| 3,995,674 A * | 12/1976 | Crawford | ........................ | 312/7.2 |
| 4,869,565 A * | 9/1989 | Bachman | ........................ | 312/234 |
| 4,958,737 A * | 9/1990 | Auerbach | ........................ | 206/557 |
| 5,072,998 A * | 12/1991 | Oh | ........................ | 312/204 |
| 5,082,235 A * | 1/1992 | Crowther et al. | ........ | 248/231.41 |
| 5,104,087 A * | 4/1992 | Wentzloff et al. | ......... | 248/442.2 |
| D338,884 S * | 8/1993 | Toedter | ........................ | D14/450 |
| 5,328,145 A * | 7/1994 | Charapich | .................. | 248/442.2 |
| 5,398,905 A * | 3/1995 | Hinson | ...................... | 248/442.2 |
| 5,437,376 A * | 8/1995 | Larsen | ............................ | 211/40 |
| 5,464,214 A * | 11/1995 | Griffin | ...................... | 273/148 B |
| 5,499,793 A * | 3/1996 | Salansky | ................... | 248/442.2 |
| 5,549,267 A * | 8/1996 | Armbruster et al. | ....... | 248/442.2 |
| 5,564,209 A * | 10/1996 | Zagnoli | ........................... | 40/594 |
| 5,638,096 A * | 6/1997 | Schwartz | ................... | 248/442.2 |
| 5,664,673 A * | 9/1997 | Perry | ............................. | 206/371 |
| 5,678,792 A * | 10/1997 | Arguin et al. | .............. | 248/205.1 |
| D392,682 S * | 3/1998 | Johnston et al. | ............. | D20/10 |
| 5,759,644 A * | 6/1998 | Stanley | ........................... | 428/14 |
| D408,802 S * | 4/1999 | Hernandez | .................... | D14/439 |
| 5,890,309 A * | 4/1999 | Markarian | ...................... | 40/733 |
| 5,894,878 A * | 4/1999 | Morgan et al. | ................ | 160/354 |
| 5,901,937 A * | 5/1999 | Compeau et al. | .......... | 248/442.2 |
| 5,988,582 A * | 11/1999 | Olivo | ........................ | 248/442.2 |
| D431,571 S * | 10/2000 | Morgan | ........................ | D14/449 |
| 6,152,311 A * | 11/2000 | German | ..................... | 211/86.01 |
| 6,168,127 B1 | 1/2001 | Saylor et al. | | |
| 6,209,973 B1 * | 4/2001 | Steinberg | ....................... | 312/7.2 |
| 6,398,178 B1 * | 6/2002 | Azola et al. | ................. | 248/442.2 |
| 6,402,269 B1 * | 6/2002 | Roth | ............................... | 312/7.2 |
| 6,412,744 B1 | 7/2002 | Wollam et al. | | |
| 6,412,889 B1 * | 7/2002 | Hummell et al. | ........... | 312/9.53 |
| 6,443,415 B1 * | 9/2002 | Sundblad | ................... | 248/442.2 |
| 6,478,282 B1 | 11/2002 | Flemming | | |
| D469,100 S * | 1/2003 | Salem | ........................... | D14/449 |
| 6,543,167 B1 * | 4/2003 | Dwyer | ............................ | 40/725 |
| 6,592,193 B1 * | 7/2003 | Curry | .............................. | 312/7.2 |

(Continued)

*Primary Examiner* — Jes F Pascua
*Assistant Examiner* — Peter Helvey
(74) *Attorney, Agent, or Firm* — Crossley Patent Law

(57) ABSTRACT

A television pocket decorator including a wire frame and a covering which engages the wire frame. The wire frame is removably attached over the upper edge of a flat-screen television monitor and the covering includes a number of pockets. An individual can place a number of pictures in the pockets. The covering can also include decorations and a message, which may be a family name or a holiday greeting.

9 Claims, 4 Drawing Sheets

(56) References Cited

U.S. PATENT DOCUMENTS

| | | | |
|---|---|---|---|
| D486,831 S * | 2/2004 | Dayani et al. | D14/448 |
| 6,817,128 B2 * | 11/2004 | Korpai | 40/725 |
| 6,826,859 B1 * | 12/2004 | Lin | 40/514 |
| D508,054 S * | 8/2005 | Ramsey | D14/448 |
| D508,695 S * | 8/2005 | Vaughn | D14/448 |
| D509,221 S * | 9/2005 | Suber et al. | D14/448 |
| D522,007 S * | 5/2006 | Cano | D14/448 |
| 7,165,687 B1 * | 1/2007 | Stevens et al. | 211/86.01 |
| 7,296,696 B2 * | 11/2007 | Brennan et al. | 211/113 |
| D621,407 S * | 8/2010 | Simonsen | D14/448 |
| 7,808,563 B2 * | 10/2010 | Sanchez | 348/818 |
| 7,841,574 B1 * | 11/2010 | Harris | 248/444.1 |
| 7,921,997 B2 * | 4/2011 | Burns | 206/320 |
| 8,020,330 B2 * | 9/2011 | Common | 40/741 |
| D654,922 S * | 2/2012 | Nguyen | D14/449 |
| D658,191 S * | 4/2012 | Ruggiero | D14/450 |
| D659,697 S * | 5/2012 | Munjas | D14/450 |
| D664,129 S * | 7/2012 | Mora | D14/239 |
| 8,910,680 B1 * | 12/2014 | Jacobs | 150/165 |
| 2004/0150943 A1 * | 8/2004 | Rock | 361/681 |
| 2006/0000135 A1 * | 1/2006 | Yoon | 40/799 |
| 2007/0138364 A1 * | 6/2007 | Wynn | 248/309.1 |
| 2011/0120894 A1 * | 5/2011 | Balogh | 206/349 |

* cited by examiner

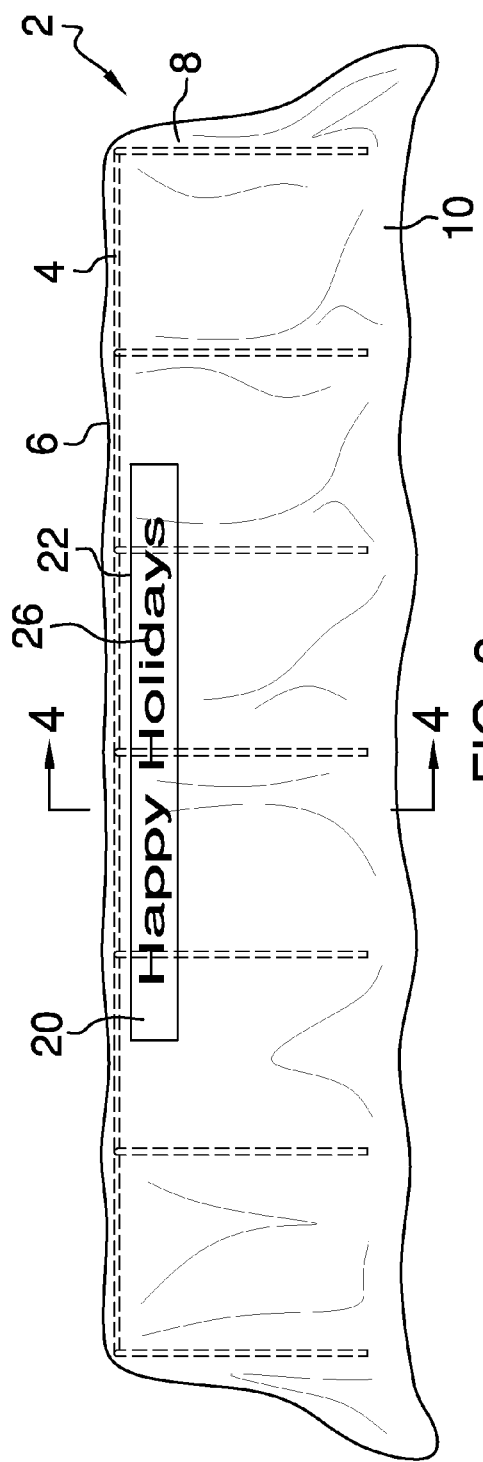
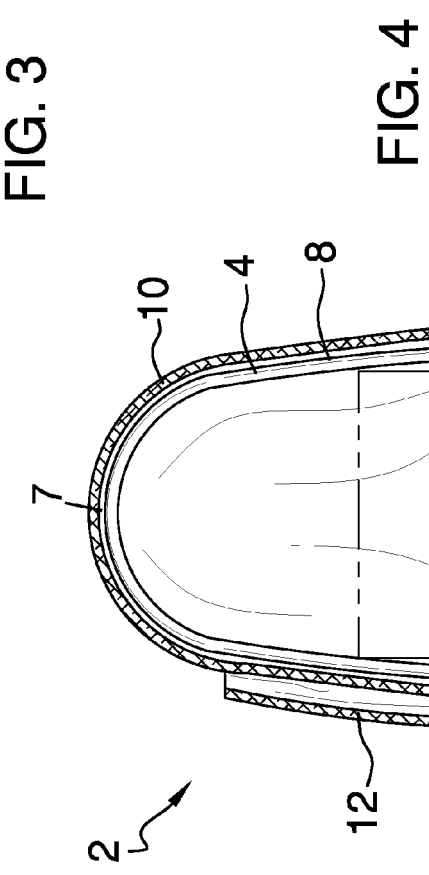

TELEVISION POCKET DECORATOR

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of television pocket decorators are in use and are known in the prior art. However, what is needed is a television pocket decorator that is removably attachable to a television, which has not yet been utilized or conceived as shown in the present invention.

FIELD OF THE INVENTION

The present invention relates to photograph and information display devices mounted to a computer monitor, and more particularly, to a television pocket decorator that is attachable to a television and includes features and characteristics above and beyond existing monitor display devices that are presently available today.

SUMMARY OF THE INVENTION

The general purpose of the present television pocket decorator, described subsequently in greater detail, is to provide a television pocket decorator which has many novel features that results in a television pocket decorator which is not anticipated, rendered obvious, suggested, or even implied by prior art, either alone or in combination thereof.

The present invention disclosed herein is a television pocket decorator. The television pocket decorator includes a wire frame. The wire frame includes a primary backing frame and a plurality of inverted U-shaped attachment frames disposed on the primary backing frame. A covering is placed over the wire frame, with the covering having a plurality of pockets. The wire frame is placed over the top of a flat-screen television monitor, where the covering can be decorated as needed. In addition, one or more pictures can be placed in the various pockets on the covering.

Thus has been broadly outlined the more important features of the present television pocket decorator so that the detailed description thereof that follows may be better understood and in order that the present contribution to the art may be better appreciated.

BRIEF DESCRIPTION OF THE DRAWINGS

FIG. 3 is a rear view of the television pocket decorator.

FIG. 4 shows a cross-sectional view of the television pocket decorator.

DETAILED DESCRIPTION OF THE DRAWINGS

Figure 1:
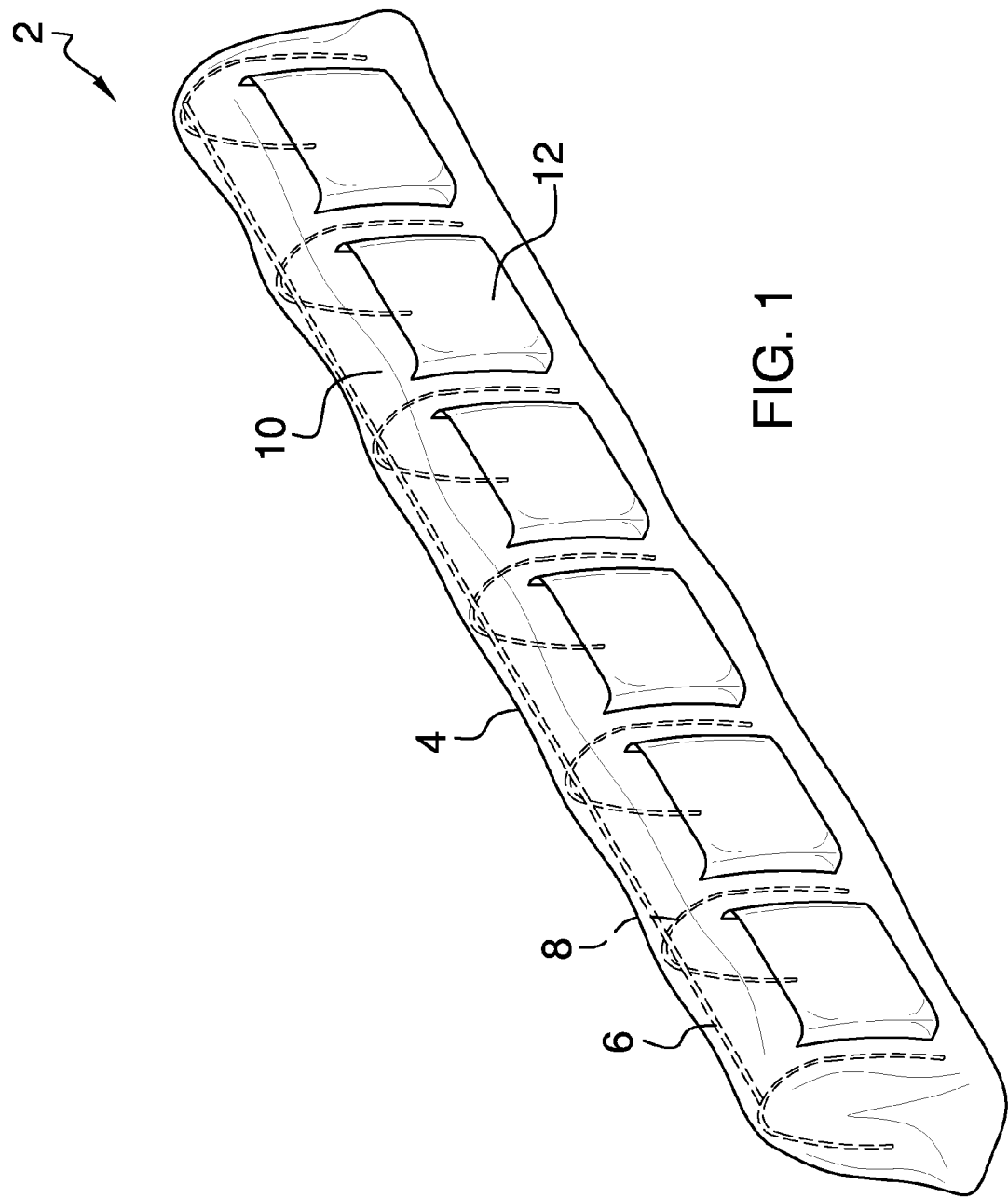
FIG. 1 is a front perspective view of the television pocket decorator.
Figure 2:
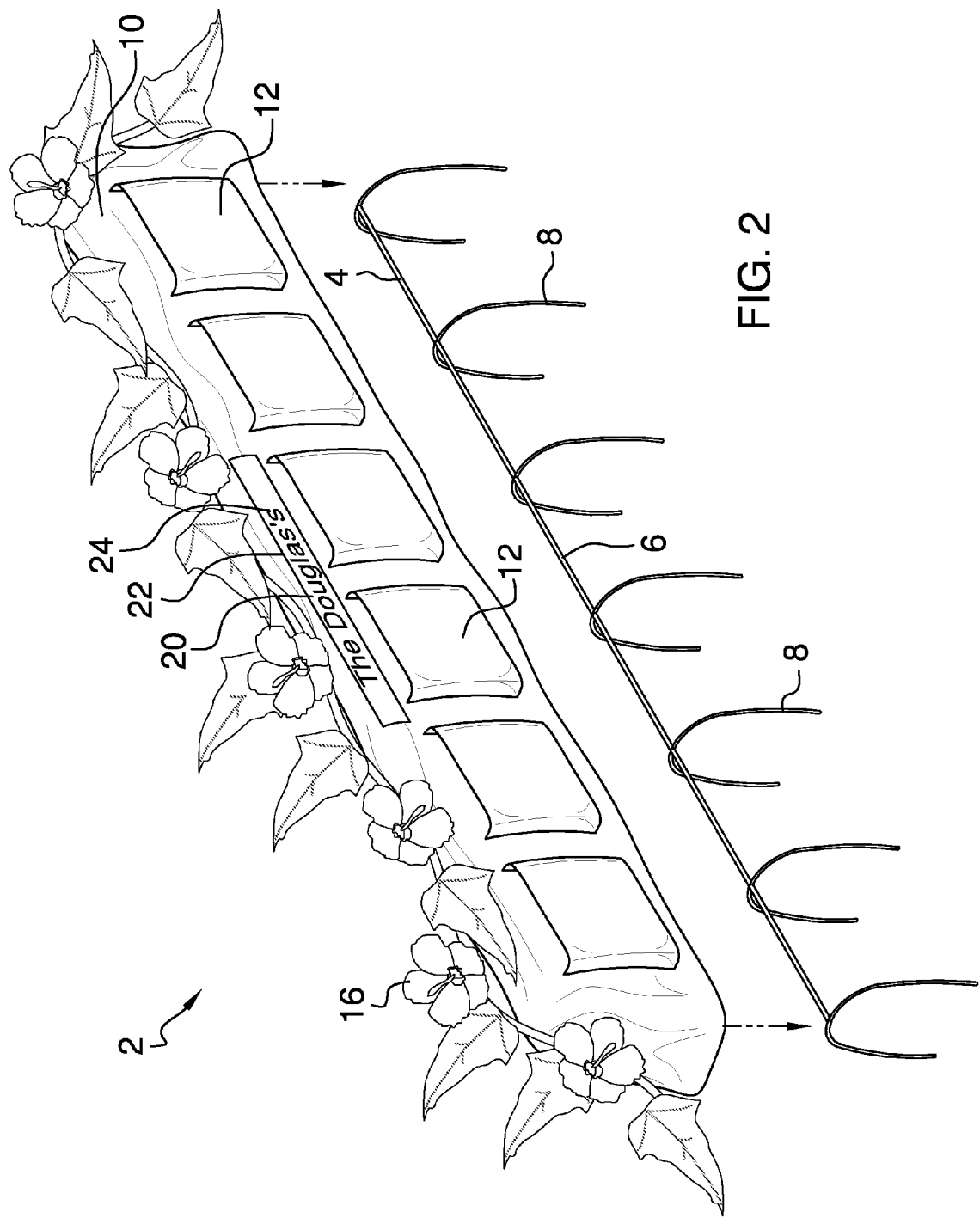
FIG. 2 is a front perspective view of the various components of the television pocket decorator.
Figure 5:
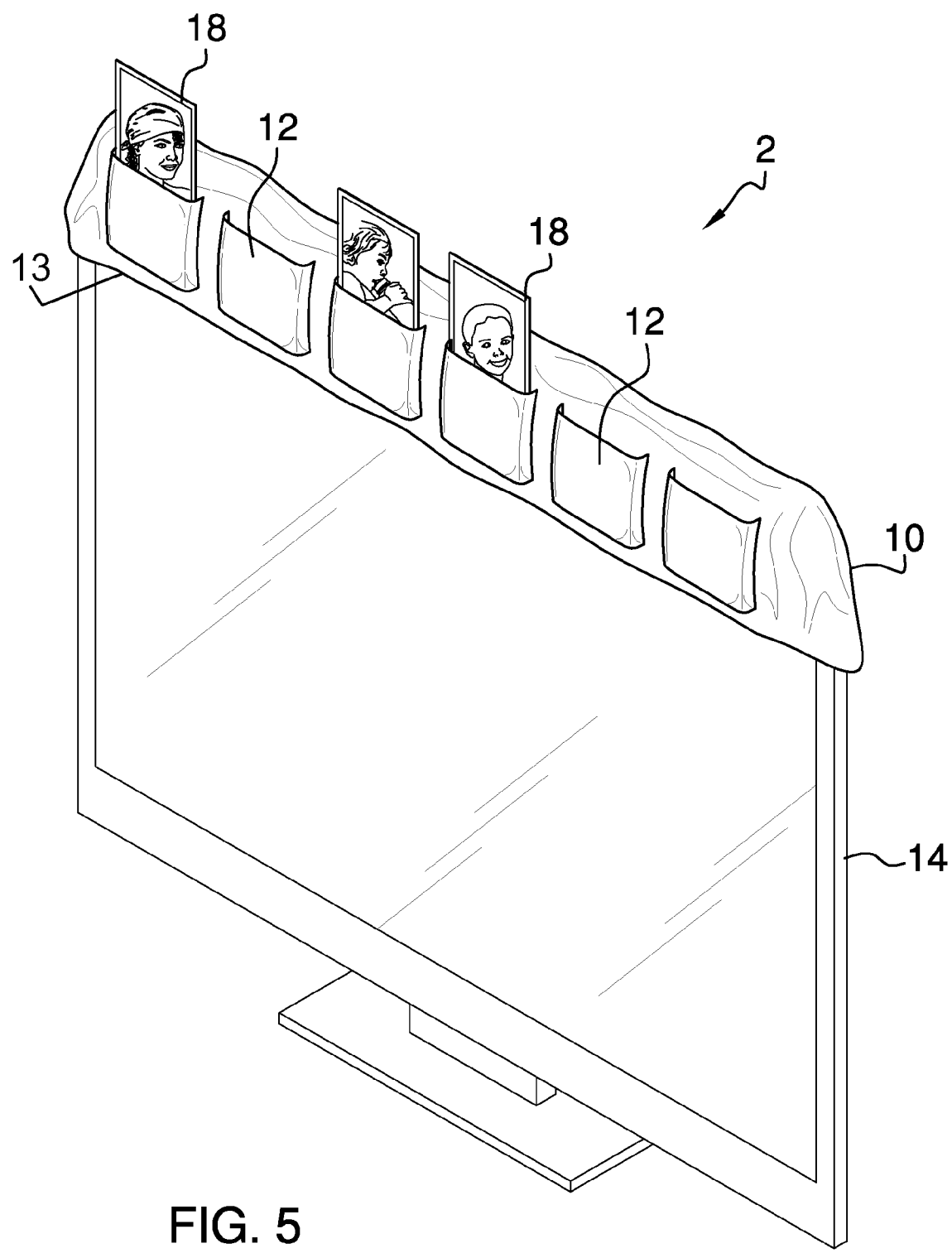
FIG. 5 shows a perspective view of television pocket decorator as it would appear in use with a television.

With reference now to the drawings, and in particular FIGS. 1 through 5 thereof, an example of the television pocket decorator employing the principles and concepts of the present invention and generally designated by the reference number 2 will be described.

Referring to FIGS. 1 through 5, a preferred embodiment of the present invention is disclosed. The television pocket decorator 2 disclosed herein includes a wire frame 4. The wire frame 4 includes a single-piece primary backing frame 6 and a plurality of inverted U-shaped attachment frames 8 that are evenly spaced out upon the primary backing frame. The primary backing frame 6 is configured to rest on an upper edge of the television monitor. Each of the attachment frames 8 has an upper apex 7 disposed on the primary backing frame 6 and a pair of outer edges 9. Each attachment frame 8 is configured to engage the television monitor from a front side to a back side thereof proximal the upper edge of the television monitor. A covering 10 is placed over the wire frame 4, with the covering 10 having a plurality of pockets 12, with the pockets 12 being evenly spaced out on the covering 10. The covering 10 is sized to fit directly over and directly adjacent to the wire frame 4. The covering 10 has a width approximately equal to a width of an upper edge of a flat-screen television monitor and has a depth approximately equal to the television monitor proximal the upper edge thereof. The covering 10 has a continuous bottom edge 13 which extends slightly beyond and covers each of the outer edges 9 of each of the attachment frames 8. The covering 10 removably engages approximately one-fourth to one-third of the length of the television monitor from the upper edge thereof.

The wire frame 4 is removably attached to the upper edge of the television monitor 14 by placing the attachment frames over the upper edge of the television monitor 14. One or more pictures 18 can be placed in the various pockets 12 on the covering.

The covering 10 can be decorated as needed with decorations 16. In addition, various lettering 20 could be placed on the cover as well to indicate a desired message 22, such as a family name 24 or a holiday greeting 26.

The invention claimed is:

1. A television pocket decorator comprising:
   a wire frame comprising:
      a single-piece primary backing frame configured to rest on the upper edge of the television monitor; and
      a plurality of inverted U-shaped attachment frames, each of the attachment frames being evenly spaced out on the primary backing frame, each of the attachment frames having an upper apex disposed on the primary backing frame and a pair of outer edges, each of the attachment frames being configured to engage the television monitor from a front side to a back side thereof proximal the upper edge of the television monitor;
   a covering sized to fit directly over and directly adjacent to the wire frame, the covering having a width approximately equal to a width of an upper edge of a flat-screen television monitor and a depth approximately equal to depth of the television monitor proximal the upper edge thereof, the covering further having a continuous bottom edge, the bottom edge extending slightly beyond and covering each of the outer edges of each of the attachment frames; and
   at least one pocket attached to the covering.

2. A television pocket decorator according to claim 1 wherein the television pocket decorator further comprises:
   a plurality of pockets attached to the covering;
   wherein the pockets are evenly spaced out on the covering.

3. A television pocket decorator according to claim 2 wherein the television pocket decorator further comprises:
   an amount of decorations;
   the decorations being attached to the covering.

4. A television pocket decorator according to claim 3 wherein the television pocket decorator further comprises:
   a message, the message including one or more letters;
   the message disposed on the covering.

5. A television pocket decorator according to claim 4 wherein the message comprises a family name.

6. A television pocket decorator according to claim 4 wherein the message comprises a holiday greeting.

7. A television pocket decorator comprising:
   a wire frame comprising:
      a single-piece primary backing frame configured to rest on the upper edge of the television monitor; and
      a plurality of inverted U-shaped attachment frames, each of the attachment frames being evenly spaced out on the primary backing frame, each of the attachment frames having an upper apex disposed on the primary backing frame and a pair of outer edges, each of the attachment frames being configured to engage the television monitor from a front side to a back side thereof proximal the upper edge of the television monitor;
   a covering sized to fit directly over and directly adjacent to the wire frame, the covering having a width approximately equal to a width of an upper edge of a flat-screen television monitor and a depth approximately equal to depth of the television monitor proximal the upper edge thereof, the covering further having a continuous bottom edge, the bottom edge extending slightly beyond and covering each of the outer edges of each of the attachment frames, the covering being configured to removably engage approximately one-fourth to one-third of the length of the television monitor from the upper edge thereof; and
   a plurality of pockets attached to the covering, wherein the pockets are evenly spaced out on the covering;
   an amount of decorations, the decorations being attached to the covering; and
   a message, the message including one or more letters, the message disposed on the covering.

8. A television pocket decorator according to claim 7 wherein the message comprises a family name.

9. A television pocket decorator according to claim 7 wherein the message comprises a holiday greeting.

* * * * *